3,549,309
PHOSPHONIUM MODIFIED POLYMERS
AND PROCESS OF MAKING THEM
Richard N. Ring, Wood-Ridge, N.J., and Andrew Oroslan, Elmhurst, and Giuliana C. Tesoro, Dobbs Ferry, N.Y., assignors to J. P. Stevens & Co., Inc., New York, N.Y., a corporation of Delaware
No Drawing. Filed Mar. 23, 1966, Ser. No. 542,187
Int. Cl. D06m 13/00, 13/46
U.S. Cl. 8—120
20 Claims This invention relates to polymeric compositions having covalently bound phosphorus in the form of quaternary phosphonium ions.

More specifically, this invention concerns compositions resulting from chemical interaction of polymers containing active hydrogen atoms with reactive quaternary phosphonium compounds. In one particular, this invention concerns cellulosic compositions modified by the introduction of groups containing quaternary phosphonium ions.

The reactive quaternary phosphonium reactants of this invention are characterized in that they have at least one vinyl, or vinyl-yielding, group bound to the phosphorus atom. It is by means of this vinyl, or vinyl-yielding, group that the quaternary phosphonium reactants interact with macromolecules having the active hydrogen radicals.

It is preferable, though by no means necessary, that the phosphonium compound have more than one functional reactive group attached to the phosphorus atom. Although at least one of these should be a vinyl or vinyl-yielding group, the remaining functionality may be provided by epoxy or hydroxymethyl groups. These latter groups, like the vinyl and vinyl-yielding groups, are capable, under the appropriate conditions, of reacting with macromolecules having reactive hydrogen. The polyfunctionality of the quaternary phosphonium reactant permits the formation of cross-links between macromolecules having reactive hydrogen, or between appropriate sites on the same macromolecules. When these functionalities are different, as when the compound has both vinyl and hydroxymethyl groups, stepwise reactions are possible. It is readily appreciated that the compounds of this invention are macromolecules in which quaternary phosphonium ions are part of a side chain or of a cross-link.

It is an object of this invention to provide new and useful polymeric materials by chemically combining the active-hydrogen class of macromolecules with quaternary phosphonium ions.

It is an object of the present invention to provide a process, essentially free of complicating side reactions, for effecting the chemical modification of active-hydrogen containing polymers by converting them into stable phosphonium derivatives.

It is a further object of the present invention to modify cellulosic materials by a reactive compound containing quaternary phosphonium ions so as to improve their flame-retardant properties or to make them more receptive to dyes.

It is another object of the present invention to minimize the care required of cellulosic fabrics and to impart to them long-lasting or permanent improvements in their properties by reacting the cellulosic materials with a polyfunctional reactive phosphonium compound.

Significantly, it has been found that permanent and valuable properties may be imparted to polymers containing active hydrogen when they are reacted with a quaternary vinyl phosphonium compound. Although the theory of this addition reaction forms no part of the invention, it is believed that the positively charged phosphorus in the quaternary phosphonium cation serves to activate the vinyl or vinyl-forming groups (sometimes referred to herein as latent-vinyl groups) attached to it, by means of its electron-withdrawing action.

In any event, quaternary phosphonium compounds having at least one vinyl group have been discovered to readily react with polymers having active hydrogen and to impart valuable improvements to them. In the case of cellulosic fabrics, for instance, this has been found, among other things, to significantly improve acid dye acceptability.

Polyfunctional reactive phosphonium compounds may react to form cross-links with polymers having reactive-hydrogen, and, in the case of cellulosic textiles, this has been found to permanently and significantly improve their wash/wear characteristics as well as to provide better dimensional stability, better shrinkage and ironing characteristics. Also obtained are better wrinkle resistance or, when desired, permanent crease deformation. Compounds and processes within the invention are therefore very useful in the manufacture of minimum-care garments.

The macromolecules containing active hydrogen, which can be modified in accordance with the invention, include the polysaccharides such as cellulose and cellulosic materials (e.g., cotton, linen, wood, rayon, paper and celluloid film), the proteins, such as silk, wool and leather, and natural polymers, such as modified cellulose (e.g., hydroxyethyl cellulose), and polypeptides. Another large class of suitable active-hydrogen containing compounds includes the synthetic polymers, co-polymers, graft polymers, block polymers, and their derivatives, which contain hydroxyl, mercapto or amino groups, such as polyvinyl alcohol, partially hydrolyzed vinyl acetate, the hydrolyzed copolymer of ethylene and polyvinyl acetate, and polyamine macromolecules. The term "polymer" as used in the claim refers generically to the above-described active-hydrogen containing materials.

The phosphonium compounds of the invention which are used as reactants in modifying cellulose and other polymeric materials containing active hydrogen atoms are described below.

Each phosphorus atom has associated with it five groups. One is an anion (An⁻) and the other four are covalently bonded groups, making the quaternary phosphonium ion as shown below in Formula I:

(I) 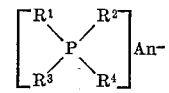

If An⁻ is the anion of an acid, such as Br⁻, I⁻, $HSO_3^-$, $CH_3OSO_3^-$, or $SO_4^=/2$, then the phosphonium compound is a phosphonium salt. If An⁻ is the hydroxyl ion, OH⁻, the resulting phosphonium hydroxide is a phosphonium base. The preferred phosphonium compounds of this invention are quaternary phosphonium salts, that is, it is preferable that An⁻ be the anion of an acid. In Formula I, at least one of the groups covalently bonded to the phosphorus atom is vinyl (—CH=CH₃) or a vinyl-generating (latent vinyl) group.

Hence, Formula I represents a class of quaternary phosphonium compounds possessing from one to four groups which are reactive with respect to the vinyl-type function. Thus, any or all of the groups $R^1$, $R^2$, $R^3$ and $R^4$ may be a reactive group taken from the set consisting of —CH=CH₂ and —CH₂CH₂Y, wherein Y is either (a) a member of the set of the oxy functions —OH (hydroxyl) and —OR (alkoxy) where R represents an organic radical such as substituted or unsubstituted alkyl, aryl, aralkyl, or (b) a polar residue derived from a reagent of weak nucleophilic character, such as the cation of a weak base or the anion of a strong acid. Nucleophilic character is defined as the tendency to donate electrons or share them with a foreign atomic nucleus (Gilman, "Organic Chemistry: an Advanced Treatise," Wiley, 1943, second edition, vol. II, p. 1859). Examples of the suitable polar residues for "Y" are —NC$_5$H$_5$ (pyridinium),

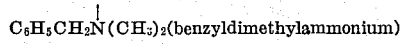
C$_6$H$_5$CH$_2$N(CH$_3$)$_2$(benzyldimethylammonium)

—NC$_9$H$_7$ (isoquinolinium), —NC$_6$H$_8$ (alpha, beta or gamma-picolinium), —OSO$_2$R (sulfite ester), —OCOR (carboxylates such as acetate, —OCOCH$_3$), —SSO$_2$ONH$_4$ (ammonium thiosulfate), —OSO$_2$OM (alkali sulfate), and —SSO$_2$OM (alkali thiosulfate), wherein M is an alkali metal and R is the same as defined above. In terms of the Lowry-Brønsted definition of acids and bases, the polar residue "Y" may be defined as the conjugate base of a Lowry-Brønsted acid which has a dissociation constant in water between $5\times10^{-6}$ and $5\times10^{-2}$. Lowry-Brønsted acids and bases were reviewed by Hine in "Physical Organic Chemistery" (McGraw-Hill, 1962, second edition), page 43.

It is important to note that, unlike other well known vinyl-activating groups which are neutral or non-ionic, there is here a positive charge associated with the phosphonium form of the phosphorus. That is to say, the activating group in this case in unusual in that it possesses a cationic character.

The balance, if any, of the enumerated R groups in Formula I other than vinyl-type groups, are organic radicals selected from the class consisting of alkyl, substituted alkyl, cycloalkyl (alicyclic), substituted cycloalkyl, aralkyl, aryl, substituted aryl, alkaryl, substituted alkaryl, heterocyclic, and substituted heterocyclic radicals.

Although no particular criticality is associated with the selection of the non-vinyl phosphorus bound R groups insofar as the broad objects of the invention is concerned, there are certain advantages associated with the selection of particular substituents. Thus, for certain purposes it has been found very advantageous to select one or more of the non-vinyl or non-latent vinyl groups from the class of epoxy or hydroxymethyl groups. The particularities of this sub-combination will be discussed hereinafter.

The general reaction of a vinyl-phosphonium compound of the type depicted in Formula I with a polymer unit containing active hydrogen (Pol-H) can be represented as follows:

Pol-H + (CH$_2$=CH—PR$_3$)$^+$An$^-$ →
(Pol-CH$_2$—CH$_2$—PR$_3$)$^+$An$^-$ (1)

Such a reaction can be effected under alkaline conditions. More specifically, the reaction of a phosphonium halide containing YCH$_2$CH$_2$— (a latent vinyl group wherein Y is defined as above) with cellulose (CellO—H) under basic conditions, may be represented in the following way:

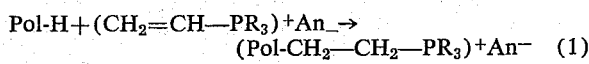

The resulting product is a side chain-modified cellulose which is ionic, with positively-charged phosphorus being indirectly covalently linked to the cellulose macromolecule. By selecting Formula I phosphorus compounds having more than one functional group, there can be obtained cross-linked polymers. Thus, when 2 or more of the enumerated R groups in Formula I are —CH=CH$_2$ (vinyl) or —CH$_2$CH$_2$Y (a latent vinyl group which yields an actual vinyl group in situ through the elimination of HY, Y being defined above), the reactive phosphonium compounds of this invention can enter into cross-linking reactions with polymer molecules containing active hydrogen atoms. Such cross-linking reactions are useful in modifying cellulosic fabric for several practical purposes, such as improving wash/wear properties, maintaining dimensional stability, minimizing progressive shrinkage, making durable creases possible, and effecting a desirable degree of recovery from unwanted creasing.

The following chemical reaction illustrates how 2 reactive sites of cellulose might undergo cross-linking with a reactive divinyl phosphonium compound.

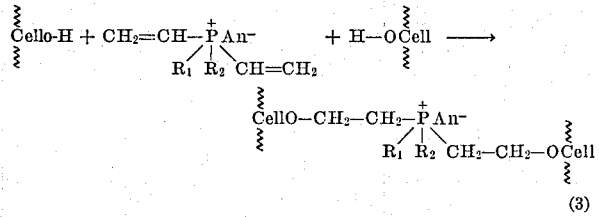

In the above reaction the squiggled lines represent an indefinite extension of the cellulose macromolecules chain.

Usually the sites which are cross-linked are on different macromolecules, but the reaction can occur on sites on the same macromolecules, often separated by many repeating units in the curled chain, although close enough in space for the linking reaction to occur.

If an actual vinyl group (—CH=CH$_2$) and a latent vinyl group (—CH$_2$CH$_2$Y) are both present, as in Formula II below:

(II) 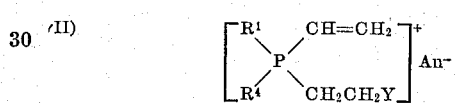

then reaction with polymers containing active hydrogen atoms can be stepwise, providing sufficient difference exists in reactivities of the 2 groups, i.e., depending on what Y is. Unsymmetrical cross-linking agents offer the added advantages of 2-step modification of cellulosic fabric.

Included within the generic Formula I of the phosphonium compounds of this invention are structures such as the following, wherein some enumerated R groups are substituted by groups having functional characteristics, such as by epoxy and hydroxyl groups:

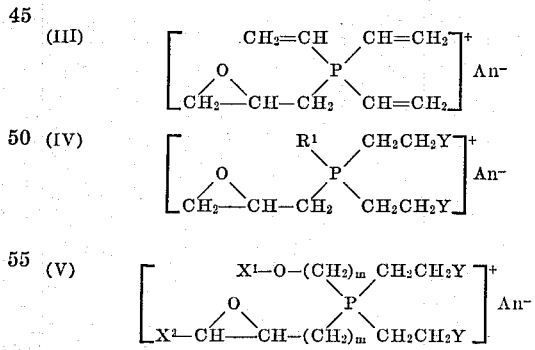

wherein $m$ is an integer of from 1 to 18, and X$^1$ and X$^2$ are selected from the class consisting of alkyl, substituted alkyl, cycloalkyl, substituted cycloalkyl, aralkyl, aryl, substituted aryl, alkaryl, substituted alkaryl, heterocyclic, substituted heterocyclic radicals, and hydrogen.

(VI) 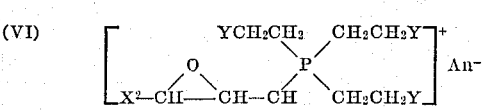

wherein X$^1$ and X$^2$ are as defined above.

(VII) 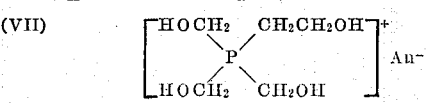

(2-hydroxyethyl-tris(hydroxymethyl)-phosphonium salt)

(VIII) 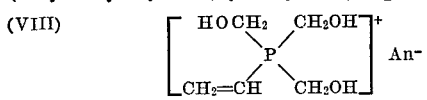

(Tris (hydroxymethyl)-vinyl-phosphonium salt)

(IX) 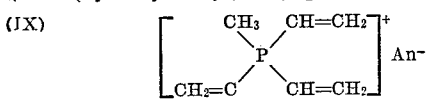

Methyl-tribinyl-phosphonium salt (X) 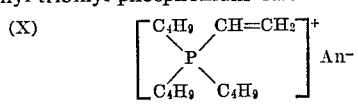

Tributyl-vinyl-phosphonium salt (XI) 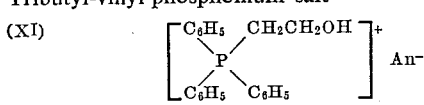

2-hydroxyethyl-triphenylphosphonium salt (XII) 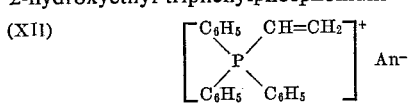

Triphenyl-vinyl-phosphonium salt

The structures of Formulas III through VI represent unsymmetrical phosphonium reactants which are useful in modifying cellulose, whether in solution, powder, film, fiber, yarn, thread, non-woven web, knit goods, or woven fabric, by stepwise reactions which can be controlled for increased efficiency. Inasmuch as groups such as epoxy or hydroxymethyl are themselves reactive under controlled conditions, they provide an additional functionality for cross-linking of cellulose or similar polymer.

For example, when vinyl (either actual or latent) and epoxy groups are part of the phosphonium ion (as in Formulas III, IV, V and VI, cross-linking of cellulose can be accomplished in two separately controlled steps, either one of which can be carried out first. When an acid condition is employed, epoxy groups interact with hydroxyl groups of cellulose in an addition reaction in which the oxirane ring is opened. Under alkaline conditions, cellulose reacts through its hydroxyl groups by adding to the vinyl portion of the phosphonium ion, thereby saturating the double bond.

Such a 2-step reaction is depicted in Equation 4 below. In the first step an acid condition is applied for the addition reaction involving an epoxy group. In the second step an alkaline condition is applied, and a second addition reaction then occurs on an active-hydrogen site with a vinyl group which is activated by the positively-charged P atom attached directly to it.

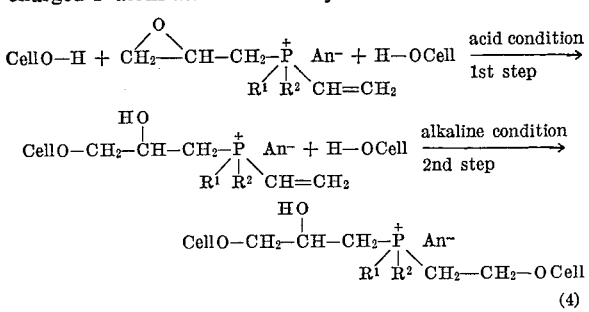

(4)

If desired, the order of the steps can be reversed. For instance, under appropriate conditions, a reaction can be carried out between vinyl groups and hydroxyl groups on cellulose, during which time the oxirane ring will remain intact, available for a subsequent cross-linking reaction under other conditions.

The reaction of the structures depicted by Formulas VII and VIII, will, under appropriate conditions result in side-chain modification or cross-linking of cellulose and other polymers containing active hydrogen atoms. It is noteworthy in this respect that the advantages of the invention may be obtained through the functionality of the reactive vinyl or latent vinyl group alone, even though other non-participating functional groups are substituted in the phosphorus atom.

For example, cotton fabric whentreated with 2-hydroxyethyl-tris-(hydroxymethyl) - phosphonium chloride (Formula VIII), dried, and then overpadded with potassium carbonate from a solution saturated with sodium chloride, re-dried, and cured, undergoes modification which may be depicted as follows:

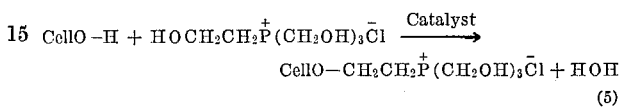

$$CellO-CH_2CH_2\overset{+}{P}(CH_2OH)_3\overset{-}{Cl} + HOH$$

(5)

Cotton fabric so modified by the phosphonium compound burns less readily than does an untreated specimen. Furthermore, the effect associated with the product of Reaction 5 is remarkably durable to wear and resistant to washing and drycleaning.

Moreover, despite the fact that the original sample of cotton fabric cannot be successfully dyed by acid dyestuffs, successful dyeing occurs on cotton fabric modified by the tris (hydroxymethyl)-phosphonium cations.

One may also bring into play the potential functionalities of the substituted groups by selecting the appropriate reaction conditions. For instance, after either 2-hydroxyethyl-tris (hydroxymethyl) phosphonium ions (structure (VII)) or tris (hydroxymethyl)-vinyl-phosphonium ions (structure (VIII)) have been linked to cellulose through the reactive vinyl groups (Reaction 5), cross-linking can be effected through the hydroxymethyl groups by using an acid catalyst (e.g., an aqueous solution of zinc tetrafluoroborate saturated with sodium chloride) at curing temperature, or by exposure to ammonia or an amino compound, followed by neutralizing and drying.

Cross-linking of the reaction product of Equation 5 through one or more of the hydroxymethyl groups is depicted by Reactions 6 and 7:

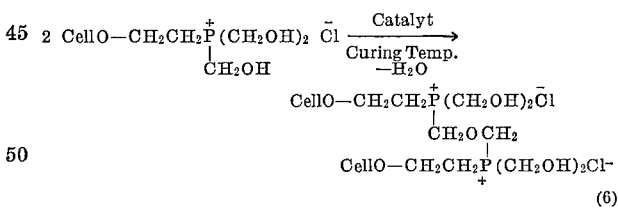

(6)

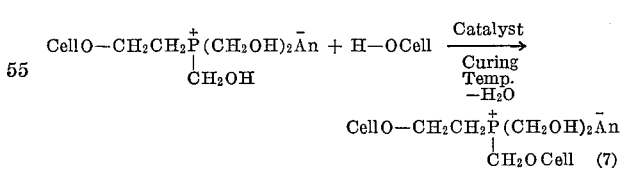

Reaction 6 depicts the co-polymerization between two phosphonium cations that have previously been covalently bonded to cellulose as shown in Reaction 5. Reaction 7 depicts the addition reaction of the product of Reaction 5 with another reactive site on a cellulose molecule.

The reverse procedure is also possible. Consequently, polyhydroxyl-phosphonium reactants of structures (VII) and (VIII) can be polymerized and/or copolymerized through hydroxymethyl groups to yield polymers containing actual or latent vinyl-phosphonium groups for further reaction with active-H polymers, such as cellulose and other polymer chains possessing numerous hydroxyl groups.

As the result of these cross-linking treatments the cotton fabric modified by 2-hydroxyethyl-tris(hydroxymethyl)-phosphonium chloride is given lasting configuration or permanent set, so that its worth or value is increased markedly. For instance, that cotton fabric, believed to be cross-linked through etherification of hydroxymethyl groups attached to phosphorus, possesses the property, even after repeated launderings, of drying with the particular configuration pressed in it during the curing operation, i.e., flat where pressed flat, and creased or pleated where that was done. These properties make possible minimum-care apparel and decorative fabrics.

The fundamental interaction between reactive vinyl-type quaternary phosphonium salts and polymeric material having active hydrogen, such as cellulosic material, can be carried out by contacting the material with a solution containing the phosphonium salt and (as a catalyst) an alkaline material such as an alkali salt of a weak acid (e.g., sodium acetate, potassium bicarbonate, alkali metal carbonate and the like) or an alkali metal hydroxide (e.g., lithium hydroxide, sodium hydroxide, or potassium hydroxide) for periods that may last for only a few seconds up to several hours, at temperatures within the range of approximately 10° C. to as high as 200° C.

In the operations of this invention involving phosphonium compounds, such as the modification and cross-linking of cellulosic fabric, it is not essential that the anion of the starting phosphonium compound be kept identical throughout the series of steps. For instance, during over-padding with NaOH saturated with NaCl, some of the original anions, such as I−, may be replaced by Cl− and OH−.

The length of time which is required to bring the reaction to substantial completion depends upon the temperature to a large extent. Once the solvent is mostly removed by evaporation, reaction times can be as brief as 10 seconds for the upper range of temperature (200° C.). The preferred temperature range is about 60° C. to about 180° C., although reaction occurs at significant rates at lower temperatures. The reaction can also be accomplished by allowing cellulosic material treated with aqueous solutions of vinyl-phosphonium salt and catalyst to remain wet at 15–30° C. or to be subjected to steam treatment followed by neutralization of the catalyst by a dilute aqueous solution of a weak acid and then washing, rinsing and drying in air.

If preferred, the polymer can first be treated with alkaline catalyst and then subsequently treated with the solution of phosphonium salt, and thereafter dried and heated. On the other hand, the polymer can be pre-treated with the solution of phosphonium salt, and the catalyst may be applied in a subsequent step.

Phosphonium salts are appreciably soluble in water; accordingly, water is often convenient to use as the solvent, although other solvents such as lower alcohols, N,N-dimethylformamide or chloroform can be used in appropriate cases. Solvents other than water may be desired, as, for instance, in effecting the reaction in the absence of a swelling agent for cellulose. Consequently, the reaction may be effected either in the presence of a swelling agent for the polymer, or in the absence of such an agent.

The manner of application or introduction of the quaternary phosphonium compound to the active hydrogen polymer depends upon the nature of the specific reactants, and the choice of methods is well within the skill of persons knowledgeable in the art. In the case of textiles, for instance, padding, dipping or spraying are suitable methods of applying solutions of phosphonium salts and catalysts, either separate, or co-dissolved.

Concentration of reactive vinyl-type phosphonium compound to active hydrogen polymer can vary widely. A range of 1% to 30% by weight of vinyl phosphonium salt to cellulosic fabric has, for example, been found quite effective for that particular combination.

Catalyst concentration depends largely on the form of activated vinyl-type groups in the particular phosphonium salt used. When the form of the group is actual vinyl, —CH=CH$_2$, then a low amount of alkaline catalyst is effective. For example, the preferable range is approximately one-hundredth to two-fifths of the weight of vinyl-phosphonium salt on the cellulosic fabric if sodium hydroxide is the catalyst, or approximately one-tenth to four-fifths of the weight of vinyl-phosphonium salt if potassium carbonate is used. Actually, the amount of alkaline catalyst, if a salt of a weak base, may be quite large, for example, 150% of the weight of phosphonium salt used. Larger amounts of catalysts generally tend to increase the reaction rate.

However, when the form of the vinyl-type group is —CH$_2$CH$_2$Y (a saturated vinyl-generating or latent vinyl group), at least one equivalent of base should be used per equivalent of HY to be neutralized after its elimination from —CH$_2$CH$_2$Y, unless HY is a non-acidic compound, such as water or an alcohol.

Catalysts such as alkali metal acetates, bicarbonates, carbonates, hydroxides, phosphates, silicates, and borates are operative and economical. As a generalization, if an acid has an ionization constant less than about $1 \times 10^{-4}$, then its alkali salt is effective and usable as a catalyst for the process of this invention over a wide range of reactive conditions. Alkali hydroxides are satisfactory when reaction conditions are carefully selected to minimize side reactions, such as those which could cause discoloration and degradation of the polymeric material.

EXAMPLE 1

Two samples of plain-weave cotton fabric (commonly known as 80 x 80 print cloth) were conditioned at a relative humidity (RH) of 65% and weighed on an analytical balance. The samples were treated with a 15% solution of methyl-trivinyl-phosphonium iodide in water, using a laboratory padder with the rolls to give a wet pickup of 90%. The fabric samples so treated were framed and dried at 60° C. in a forced draft oven. The two dried samples were overpadded, respectively, with 3% and 6% aqueous sodium hydroxide solutions saturated with sodium chloride. The fabric samples so treated were rolled on rubber tubes, then covered with polyethylene sheets, and allowed to remain wet for 24 hours at room temperature. Then the samples were neutralized in a dilute aqueous solution of acetic acid, rinsed in N,N-dimethylformamide to remove extraneous un-bonded polymeric matter, and finally washed in a nonionic detergent solution at 60° C. The washed samples were dried in frames in a forced draft oven, conditioned at 65% RH, and weighed on an analytical balance. The following results were obtained.

| | | | | Percent phosphorus | |
| --- | --- | --- | --- | --- | --- |
| | NaOH, percent | Weight gain, percent [1] | Yield, percent [1] | Found by analysis | Calcd. from wt. g. |
| Sample: | | | | | |
| A | 1.5 | 5.9 | 44 | 0.8 | 0.68 |
| B | 3.0 | 6.9 | 51 | | |

[1] Corrected for change in moisture regain.

The crease recovery and tensile properties of the treated samples and an untreated control sample of the cotton fabric are reported in the table below:

| | Crease recovery [1] (warp plus fill) angular degrees | | Tensile strength, lbs.[2] (warp direction) |
| --- | --- | --- | --- |
| | dry | wet | |
| Sample: | | | |
| A | 263 | 283 | 34 |
| B | 270 | 292 | 35 |
| Control (untreated) | 187 | 164 | 62 |

[1] Method used throughout is ASTM-D-1295-60T.
[2] Method used throughout is ASTM-D-1682-59T.

No weight loss resulted after Sample A has been exposed to extraction by 50 times its weight of toluene for 2 hours at reflux temperature, thus indicating that methyl-trivinyl-phosphonium iodide and cotton had interacted chemically to produce a stable modification of the cellulose.

EXAMPLE 2

Two samples of plain weave fabric were conditioned at 65% RH and weighed on an analytical balance. They were treated with a 15% aqueous solution of methyl-trivinyl-phosphonium iodide, using a laboratory padder with the rolls set to give a wet pickup of 90%. The fabric samples so treated were dried on frames at 60° C. in a forced draft oven. The two dried samples were over-padded, respectively, with 3% and 6% aqueous potassium carbonate solutions saturated with sodium chloride. The fabric samples so treated were framed to original size, dried at 60° C., then cured at 150° C. for 5 minutes in a forced draft oven. The samples were neutralized, rinsed, washed, dried, conditioned and weighed, as specified in Example 1. Results were as follows:

| | | Weight gain, percent[1] | Yield, percent | Percent phosphorus | |
|---|---|---|---|---|---|
| | $K_2CO_3$, percent | | | Found by analysis | Calcd. from wt. g. |
| Sample: | | | | | |
| C | 3 | 5.7 | 43 | 0.86 | 0.74 |
| D | 6 | 6.5 | 49 | | |

[1] Corrected for change in moisture regain.

Physical properties of the treated samples were as follows:

| | Crease recovery (warp plus fill) angular degrees | | Tensile strength, lbs. (warp direction) |
|---|---|---|---|
| | dry | wet | |
| Sample: | | | |
| C | 313 | 295 | 28 |
| D | 313 | 298 | 27 |
| Control (untreated) | 187 | 164 | 62 |

Only 5% of the added weight was lost after Sample C was exposed to extraction by toluene under conditions set forth in Example 1.

EXAMPLE 3

The steps of Example 2 were repeated except that in place of the curing step as specified in Example 2 the treated samples were steamed in a laboratory steamer at atmospheric pressure for the times specified below. Results were as follows:

| | $K_2CO_3$, percent | Steaming time, Min. | Weight gain, percent[1] | Yield, percent | Percent phosphorus | |
|---|---|---|---|---|---|---|
| | | | | | Found by analysis | Calcd. from wt. g. |
| Sample: | | | | | | |
| E-1 | 3 | 5 | 6.4 | 47 | 0.86 | 0.74 |
| E-2 | 3 | 16 | 6.0 | 45 | | |
| F-1 | 6 | 5 | 7.5 | 57 | 0.67 | 0.85 |
| F-2 | 6 | 10 | 7.0 | 52 | | |

[1] Corrected for change in moisture regain.

Physical properties of the treated samples were as follows:

| | Crease recovery (warp plus fill) angular degrees | | Tensile strength, lbs. (warp direction) |
|---|---|---|---|
| | Dry | Wet | |
| Sample: | | | |
| E-1 | 285 | 214 | 27 |
| E-2 | 268 | 298 | 30 |
| F-1 | 283 | 314 | 28 |
| F-2 | 261 | 301 | 29 |
| Control (untreated) | 187 | 164 | 62 |

EXAMPLE 4

Treated samples corresponding to F-1 of Example 3 were kept for 3 hours at 65° C. in 30 times their weight of 0.5-normal aqueous sodium hydroxide. Under these harsh conditions, 44% of the added weight was lost, and crease recovery values of the alkali-treated samples were as follows:

Dry crease recovery: 246 (instead of original 283)
Wet crease recovery: 274 (instead of original 314)

It is seen that crease recovery remained relatively high even after drastic treatment with alkali.

EXAMPLE 5

Sample F-1 of Example 3 was readily dyed with Acid Azure Blue 9 (Color Index No. 42090, an acid dyestuff not substantive to cotton) to a deep blue shade under the following conditions: 2 grams of dyestuff per liter of solution; 30 minutes at 100° C. at a 1:30 fabric to liquor ratio.

Under the same above conditions an unmodified cotton sample remained undyed. As a rule, unmodified cotton is unreceptive to acid dyes.

EXAMPLE 6

The procedure and conditions of Example 2 were followed, except that tributyl-vinyl-phosphonium bromide (TBVPBr) was used in place of methyl-trivinyl-phsophonium iodide and the potassium carbonate solutions were at 4 and 8% concentrations, respectively. The results were as follows:

| Sample: | TBVPBr on wt. of fabric, percent | K₂CO₃, percent | Weight gain, percent¹ | Yield, percent | Percent phosphorus Found by analysis | Percent phosphorus Calcd. from wt. g. |
|---|---|---|---|---|---|---|
| G | 16.4 | 4 | 3.5 | 21 | 0.57 | 0.34 |
| H | 16.4 | 8 | 2.4 | 15 | | |

¹ Corrected for change in moisture regain.

EXAMPLE 7

The procedure and conditions of Example 2 were followed, except that triphenyl-vinyl-phosphonium bromide (TPVPBr) was used in place of methyl-trivinyl-phosphonium iodide and the potassium carbonate solution in concentrations were 4% and 8%, respectively. The results were as follows:

| Sample: | TPVPBr, percent on wt. of fabric | K₂CO₂ percent | Weight gain, percent¹ | Yield, percent |
|---|---|---|---|---|
| I | 17.0 | 4.0 | 3.6 | 21 |
| J | 17.4 | 8.0 | 3.0 | 17 |

¹ Corrected for change in moisture regain.

After sample I was subjected to an extractive treatment in toluene under the conditions specified in Example 1, it was found that 81% of the added weight had been retained.

EXAMPLE 8

The procedure of Example 3 was followed, except that tributyl-vinyl-phosphonium bromide (TBVPBr) was used in place of methyl-trivinyl-phosphonium iodide and the potassium carbonate solution concentrations were 4 and 8%, respectively. Results were as follows:

| Sample | TBVPBr on wt. of fabric percent | K₂CO₃ percent | Steaming time, min. | Weight gain, percent¹ | Yield percent | Percent phosphorus Found by analysis | Percent phosphorus Calcd. from wt. g. |
|---|---|---|---|---|---|---|---|
| K | 16.4 | 4.0 | 15 | 6.0 | 36 | 0.65 | 0.57 |
| L | 16.4 | 8.0 | 15 | 6.6 | 40 | 0.61 | 0.62 |

¹ Corrected for change in moisture regain.

Sample L was dyed with Acid Azure Blue 9 under the conditions listed in Example 5. A deep blue shade resulted.

EXAMPLE 9

Samples of plain-weave cotton fabric were treated with a 15% aqueous solution of 2-hydroxyethyl-triphenyl-phosphonium chloride containing varying amounts of potassium carbonate. The treatment was carried out on a laboratory padder with its rolls set to give 87–91% wet pickup. The samples so treated were dried on frames at 60° C., then cured at 150° C. in a forced draft oven for the time specified below. Then the samples were neutralized, rinsed, washed and dried as described in Example 1. Results were as follows:

| Sample | K₂CO₃ percent | Curing time, min. | Weight gain, percent¹ | Yield percent | Percent phosphorus Found by analysis | Percent phosphorus Calcd. from wt. g. |
|---|---|---|---|---|---|---|
| M | 4.5 | 5 | 3.7 | 29 | | |
| N | 4.5 | 10 | 3.3 | 26 | | |
| O | 1.5 | 5 | 5.4 | 43 | 0.47 | 0.48 |

¹ Corrected for change in moisture regain.

Samples of O were successfully dyed with Acid Azure Blue 9 to a deep blue shade under the dyeing conditions specified in Example 5.

The examples show that the bond achieved between the vinyl phosphonium compound and the macromolecule containing reactive hydrogen is highly resistant to removal by washing or to attack by solution. Even prolonged and severe solvent extraction techniques do not remove the improvements imparted to the polymer by the chemical addition of the quaternary phosphonium compound. The modest levels of phosphonium addition used in the examples (2% to 7.5% weight increase) were sufficient to show significant and permanent improvements in the crease recovery properties of the treated fabric as well as much improved receptivity to acid dyes, while still maintaining acceptable levels of tensile strength.

It is also noted that when the reaction is carried out with quaternary phosphonium compounds having polyfunctional vinyl groups capable of undergoing cross-linking reaction, the chemical bond is particularly strong. On the other hand, compounds having only a single vinyl functional group are shown to achieve bonds which are only slightly less strong than those formed by components capable of forming cross-links.

The examples given above utilize a cotton fabric as a source of reactive hydrogen in a macromolecule, and such a combination has been found to be particularly convenient from the sandpoint of studying the interaction of several of the quaternary phosphonium compounds of the invention under widely different conditions. However, it is contemplated that other macromolecules having reactive hydrogen undergo reactions of the kind formed by practicing the invention, and that the relation thereof is a matter of choice depending on the particular use to which the product is to be placed.

Although the invention is particularly useful for the modification of materials composed of cellulose fibers or other textile materials, it may also be used to modify polymers that under ordinary conditions would be classified as liquids. Furthermore, one could, according to the invention, modify intermediate polymers which can, under appropriate conditions, be subsequently used to treat or react with still other polymers to impart properties associated both with the quaternary phosphonium groups and the intermediate polymer. For example, one could in one step modify an alkylenepolyamine with a polyfunctional vinyl phosphonium compound through a reaction involving the more reactive of one of the vinyl functionalities, i.e., as where the compound has a highly reactive vinyl group and a less reactive latent vinyl group. Thereafter, alkylenepolyamine having the pendant quaternary phosphonium group could be reacted with a completely different kind of active hydrogen bearing macromolecules, such as paper or cotton, through the latent vinyl group. The resulting product has the benefits associated with the quaternary phosphonium compound and the alkylenepolyamine.

It is thus seen that in practicing the invention one may select polyfunctional quaternary phosphonium compounds as defined herein which are capable of undergoing cross-linking reactions, and, by virtue of the differences in the reactivity of the functional groups, the compounds may be reacted in stages to cross-link two or more polymers of widely different character.

To sum up the most advantageous properties of the invention, it is seen that it provides modified polymers that are very stable and have the added chemical structures covalently bound to the macromolecules so that the resulting products are not significantly impaired by storage, processing, or certain other treatments, either in manufacture or in use by the consumer.

Furthermore, certain polyfunctional reactive phosphonium compounds impart additional improvements when they are used in modifying cellulosic textiles, namely better wash/wear properties, greater dimensional stability or minimized progressive shrinkage, minimum ironing characteristics, a more desirable degree of crease recovery or permanent deformation and flame retardance.

What is claimed is:

1. The phosphonium modified polymer obtained by reacting an active hydrogen-containing polymer with a quaternary phosphonium compound of the formula:

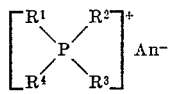

wherein $R^1$, $R^2$, $R^3$ and $R^4$ are radicals selected from the group consisting of alkyl of 1 to 4 carbons, phenyl, hydroxymethyl, vinyl and

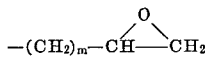

wherein $m$ is an integer of from 1 to 18, at least two of $R^1$, $R^2$, $R^3$ and $R^4$ being selected from the group consisting of hydroxymethyl,

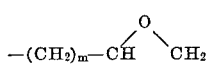

and vinyl and at least one being vinyl, and wherein $An^-$ is an anion.

2. The phosphonium modified cellulose obtained by reacting cellulose with a quaternary phosphonium compound of the formula:

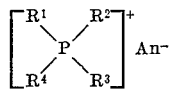

wherein $R^1$, $R^2$, $R^3$ and $R^4$ are selected from the group consisting of alkyl of from 1 to 4 carbons, vinyl, hydroxymethyl and 2,3-epoxypropyl, there being no more than 2 alkyl groups, and $An^-$ is an anion selected from the group consisting of chloride, bromide, iodide, hydroxide, sulfate, bisulfate and methyl sulfate.

3. The modified cellulose according to claim 2 wherein at least two of $R^1$, $R^2$, $R^3$ and $R^4$ are vinyl.

4. The modified cellulose according to claim 2 wherein at least one $R^1$, $R^2$, $R^3$ and $R^4$ is hydroxymethyl.

5. The modified cellulose according to claim 2 wherein at least one of $R^1$, $R^2$, $R^3$ and $R^4$ is 2,3-expoxypropyl.

6. The modified cellulose according to claim 3 wherein the phosphonium moiety is methyl trivinyl phosphonium.

7. The modified cellulose according to claim 3 wherein at least one vinyl is derived from —$CH_2CH_2Y$ wherein Y is hydroxyl or a polar residue derived from a reagent of weak nucleophilic character.

8. The modified cellulose according to claim 4 wherein the phosphonium moiety is tris(hydroxymethyl) vinyl phosphonium.

9. The modified cellulose according to claim 4 wherein the phosphonium moiety is tris (hydroxymethyl) 2-hydroxyethyl phosphonium.

10. The modified cellulose according to claim 5 wherein the phosphonium moiety is trivinyl 2,3-epoxypropyl phosphonium.

11. The method of making phosphonium modified polymers comprising reacting an active hydrogen-containing polymer with a quarternary phosphonium compound of the formula:

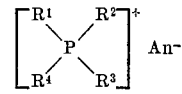

wherein $R^1$, $R^2$, $R^3$ and $R^4$ are radicals selected from the group consisting of alkyl of 1 to 4 carbons, phenyl, hydroxymethyl, vinyl and

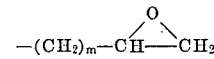

wherein $m$ is an integer of from 1 to 18, at least two of $R^1$, $R^2$, $R^3$ and $R^4$ being selected from the group consisting of hydroxymethyl,

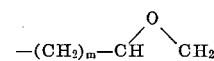

and vinyl and at least one being vinyl, and wherein $An^-$ is an anion so as to form a covalent bond between the phosphonium group and the polymer.

12. The method of making phosphonium modified cellulose comprising reacting cellulose with a quaternary phosphonium compound of the formula:

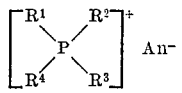

wherein $R^1$, $R^2$, $R^3$ and $R^4$ are selected from the group consisting of alkyl of from 1 to 4 carbons, vinyl, hydroxymethyl and 2,3-epoxypropyl, there being no more than 2 alkyl groups, and $An^-$ is an anion selected from the group consisting of chloride, bromide, iodide, hydroxide, sulfate, bisulfate and methyl sulfate, so as to form a covalent bond between the phosphonium group and the cellulose.

13. The method according to claim 12 wherein at least two covalent bonds are formed between the phosphonium group and the cellulose to effect cross-linking thereof.

14. The method according to claim 13 wherein said covalent bonds are formed by reaction of a phosphonium compound containing at least two vinyl groups under alkaline conditions.

15. The method according to claim 13 wherein said covalent bonds are formed by reaction of a phosphonium compound containing at least one vinyl group and at least one epoxypropyl group.

16. The method according to claim 13 wherein said cellulose and said compound are initially reacted under alkaline conditions to effect reaction through the vinyl group, and then under acid conditions to effect reaction through the epoxypropyl group.

17. The method according to claim 13 wherein said cellulose and said compound are initially reacted under acid conditions to effect reaction through the epoxypropyl group and then under alkaline conditions to effect reaction through the vinyl group.

18. The method according to claim 13 wherein said covalent bonds are formed by reaction of said phosphonium containing at least one vinyl group and at least one hydroxymethyl group.

19. The method according to claim 14 where at least one vinyl group is formed in situ from —$CH_2CH_2Y$ wherein Y is hydroxyl or a polar residue derived from a reagent of weak nucleophilic character.

20. The method according to claim 18 wherein said cellulose and said phosphonium compound are initially reacted through said vinyl group under alkaline conditions and are subsequently reacted through said hydroxymethyl group in the presence of an acid catalyst at curing temperatures or in the presence of ammonia or amino compounds.

References Cited

UNITED STATES PATENTS 3,421,834  1/1969  Grayson _____ 8—129X

MAYER WEINBLATT, Primary Examiner

U.S. Cl. X.R.

8—84, 116; 117—137, 143; 260—209, 212, 231

UNITED STATES PATENT OFFICE
CERTIFICATE OF CORRECTION

Patent No. 3,549,309    Dated  December 22, 1970

Inventor(s)  Richard N. Ring et al.

It is certified that error appears in the above-identified patent and that said Letters Patent are hereby corrected as shown below:

Column 2, line 34, "claim" should read -- claims --; line 45, the formula should read 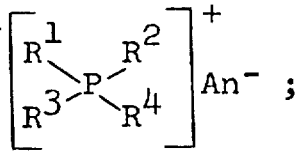 line 57, the formula should read -- -CH=CH$_2$ --. Column 3, line 24, "in" s read -- is --; line 47, "An_" should read -- An$^-$ --. Column 4 line 69, the left-hand portion of the formula should read --
$X^2 - CH - \overset{O}{\underset{|}{CH}} - \overset{X^1}{\underset{}{CH}}$ --. Column 5, line 10, left-hand portion o the formula should read CH$_2$=CH-; line 11, "tribinyl" should re -- trivinyl --; line 39, "VI" should read -- VI) --. Column line 8, "whentreated" should read -- when treated --. Column line 36, after "rolls" insert -- set --. Column 7, line 24, "K$_2$CO$_2$" should read -- K$_2$CO$_3$ --. Column 8, line 39, "sandpoi should read -- standpoint --. Column 13, line 45, the formul should read --                              Column 14, line 30, t

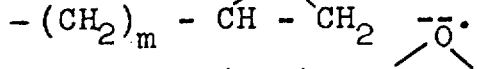

formula should read -- $-(CH_2)_m- CH \overset{O}{\underset{}{\diagdown}} CH_2$ --; lines 60 and 65 each instance, "13" should read -- 15 --.

Signed and sealed this 2nd day of November 1971.

(SEAL)
Attest:

EDWARD M. FLETCHER, JR.          ROBERT GOTTSCHALK
Attesting Officer                Acting Commissioner of Patents